March 6, 1928.                O. L. BARNEBEY                1,661,403
                        PROCESS OF SEPARATING LIQUIDS
                            Filed Sept. 9, 1920
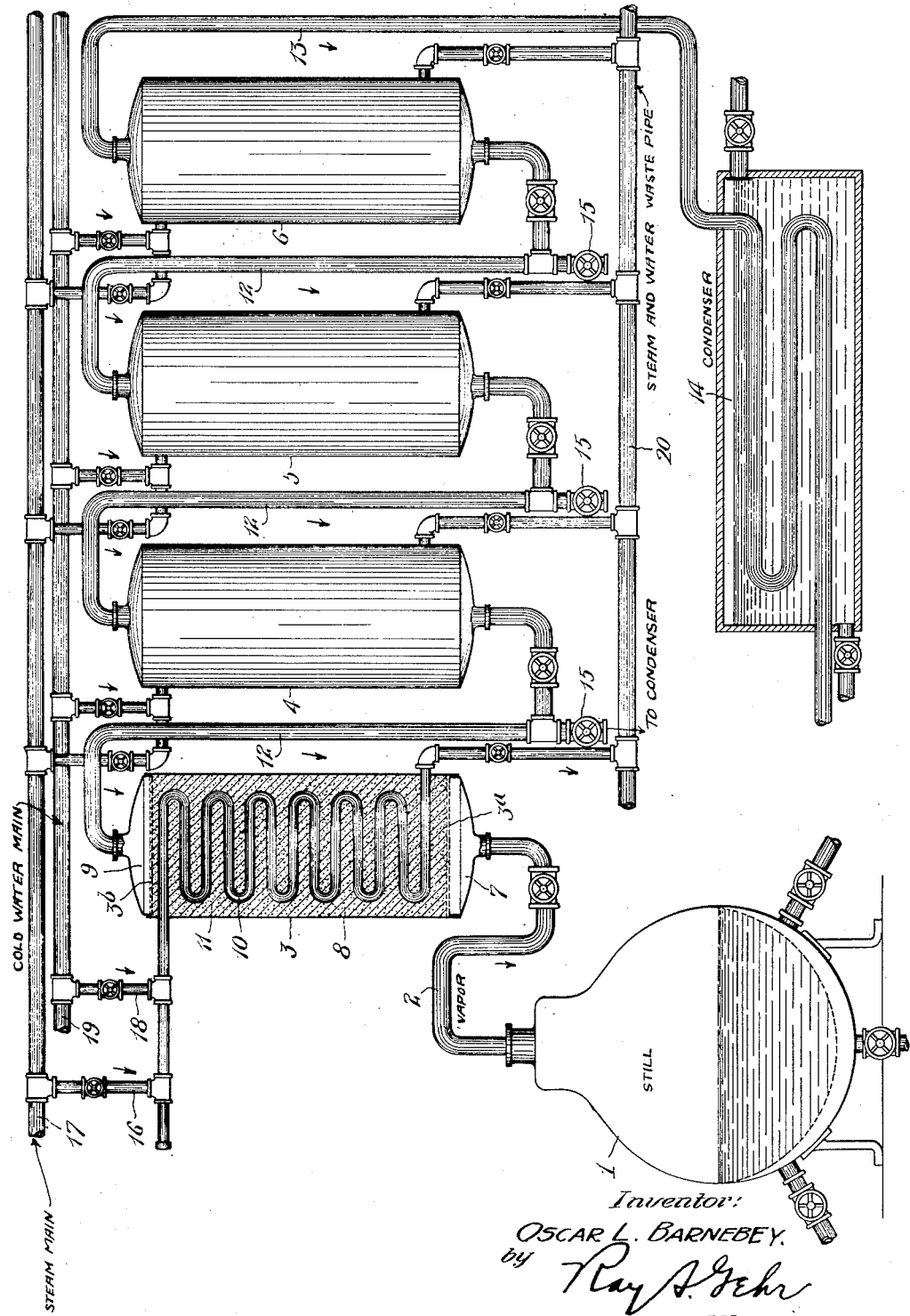
Inventor:
OSCAR L. BARNEBEY.
by Ray A. Gehr
           Attorney Patented Mar. 6, 1928.

1,661,403

UNITED STATES PATENT OFFICE.

OSCAR L. BARNEBEY, OF CLEVELAND, OHIO, ASSIGNOR TO AMERICAN SOLVENT RECOVERY CORPORATION, A CORPORATION OF OHIO.

PROCESS OF SEPARATING LIQUIDS.

Application filed September 9, 1920. Serial No. 409,065.

This invention relates to a method of separating the constituents of liquid mixtures in which distillation is supplemented in a manner that results in a more effective separation of the constitutents.

When a mixture of liquid chemical compounds is distilled there is a tendency for the liquid of lowest boiling point to distill first and that of highest boiling point to distill last. In some cases the distillation effects a rather clean separation of the constituents, but usually there is no sharp separation inasmuch as the higher boiling point compound has a distinct vapor pressure and the compound of lower boiling point carries the vapor of the higher boiling point compound along with it to a greater or less extent. Naturally the higher the temperature becomes the greater the vapor pressure of the compound of higher boiling point and the greater the tendency for its vapor to distill with the compound of lower boiling point. To overcome this tendency fractionating columns are used. However, these are not always successfully applied. Consequently it results that economic losses are suffered in separating liquids by distillation.

The object of the present invention is the provision of a process of separating the constituents of liquid mixtures that is not subject to the imperfections and losses above mentioned.

My invention is based upon the discovery that when adsorbing agents adsorb different liquids these liquids are not held by the force of adsorption to the same extent. In other words I have discovered that liquids can be separated from each other by the use of adsorbing agents. When a mixture of liquids is adsorbed by an adsorbing agent the latter holds the various liquid chemical compounds in a preferential manner, some being easily removed from the adsorbing agent, others being removed with difficulty. In general, the compounds having the highest boiling points are held more firmly than those of lower boiling points. Likewise compounds of high molecular weights are held more tenaciously than those of lower molecular weights. However, the effectiveness with which the force of adsorption holds a given liquid cannot be completely foretold by its boiling point or its molecular weight. It can only be said that within an homologous series of a given set of chemical compounds there is a decided preferential holding tendency, accumulating in strength as the molecular weights of the compounds increase within the series.

When compounds are adsorbed such adsorption is frequently accompanied by the evolution of considerable quantities of heat, which shows the vigor of the adsorption phenomenon. After a mixture of compounds has been adsorbed energy must be exerted to increase the vapor pressure in order to release the adsorbed liquids. Heating, or exhausting by means of vacuum, or both, are effective means of vaporizing and releasing the adsorbed liquids. When the adsorbing material is heated, or exhausted, or both, certain liquids are removed readily while others are held firmly. I find that in many cases this preferential adsorbing affinity can be used to separate liquids more effectively than ordinary distillation, the liquid for which the adsorption affinity is least being released from the adsorbent first, that is at a lower temperature or suction, and the liquid of greatest adsorbing tendencies being held to the last. In this more effective separation lies the value of my discovery.

The following adsorptive materials have been found applicable to this invention although the invention is not limited to these specific materials.

Activated carbon which is produced by treating coconut shell charcoal with steam at temperatures of approximately 900° C. is highly adsorptive and can be used for separating liquids by this method. Hydrated alumina, precipitated by adding ammonia to an aluminum salt in solution and the precipitate filtered out and carefully dried, yields an adsorptive product which can be used for separating liquids. Also, hydrated aluminum silicate, ferric oxide and other hydrates can be precipitated and dried to yield good separating materials for liquids. Such materials owe their strong adsorbing power to the enormous surfaces available for adsorption due to the exterior and interior areas of the particles. The class of substances mentioned above, and those best applicable to this invention, are those which have not not only the outer surface areas but enormous interstitial, pore or crack areas available for liquid adsorption. The special treatment mentioned above makes these materials highly adsorptive and applicable to this invention.

The applications of this invention are many, both as to the adsorbing materials to be used and as to the liquids separated by their application. The adsorbent materials can be finely ground, or in granular particles, or in lumps, to suit specific cases. The material can be placed directly in the flask or retort used for distillation or can be placed in a secondary flask, vessel or retort and the liquids distilled into it. Again, the adsorbing material can be placed in a column through which the vapors or gases pass from the flask, retort or still. In this latter case the compound or compounds with least adsorbing affinity will have a tendency to pass through, and the compound or compounds with most adsorbing affinity will remain adsorbed in the adsorbing material. By maintaining the temperature of the secondary flask, vessel, retort, or still or column mentioned above, at a certain definite temperature which is just sufficient to counteract the adsorption affinity of the lightest compound or compounds adsorbed, the same can be liberated and removed while the other or others remain adsorbed in the adsorbing material. To remove the other or others the temperature, or suction, or both, must then be progressively increased. The compound or compounds with least adsorbing affinity is or are removed first and those of greatest adsorbing affinity are removed last.

Instead of a single secondary vessel or column for adsorption, a plurality of them may be used, and in such a case the respective columns are preferably maintained at different temperatures during adsorption.

To facilitate a clear understanding of my improved process reference is had to the accompanying drawing which shows diagrammatically apparatus suitable for practicing my invention.

In the drawing, 1 is a still adapted to be heated by steam and connected by a pipe 2 with the bottom of the first of a plurality of adsorbing columns 3, 4, 5 and 6 which are connected together in series. These columns are similar in construction and the description of column 3 will suffice for all. The interior of the column is divided by transverse foraminous diaphragms 3ᵃ and 3ᵇ into a bottom chamber 7, a middle chamber 8 and a top chamber 9. In the middle chamber 8 is arranged a heating and cooling coil 10 which is embedded in a mass of adsorbent material 11 such as activated charcoal. The top of each column is connected as by a pipe 12 with the bottom of the next column of the series, with the exception of the last column 6, which has its top chamber connected by a pipe 13 with a condenser 14. Each of the adsorbing columns is provided with a vapor discharge pipe 15 which may lead to a suitable condenser, not shown. Each of the cooling coils 10 is connected at its upper end by a pipe 16 with a steam pipe 17 and by means of a pipe 18 with a cold water pipe 19. At its lower end, each coil 10 is connected with a discharge pipe 20.

In carrying out my improved process with this apparatus, the liquid mixture of chemical compounds is heated in the still 1 to cause the vapors to pass over and through the series of adsorbing columns. These columns are preferably maintained at different temperatures. For example, column 3 might be maintained at 90° C., column 4 at 75° C., column 5 at 60° C., and column 6 at 45° C., the temperatures being regulated by controlling the amount of heating or cooling medium passed through the coils 10. In other words the series of adsorbing columns are maintained at successively lower temperatures, the last column 6 preferably being held at a temperature just sufficiently elevated so that the vapor of least adsorbing affinity is not adsorbed, but passes over and is condensed in the condenser 14. The vapor of next greater adsorbing affinity is adsorbed in the column 6, that of next greater adsorbing affinity in column 5, etc., the vapor of highest adsorbing affinity being held in column 3.

It will, of course, be understood that each column may adsorb more than a single compound, depending upon the nature of the compounds and the differences in temperature between the columns.

When the adsorption has been carried to the point of saturation or as far as may be desired, communication between the columns is shut off by closing valves in pipes 12 and the adsorbent material of each column is heated causing an evolution of the adsorbed compound or compounds in the form of vapor which is conducted away through the discharge pipe 15 to a suitable condenser and thus recovered.

In the diagram, I have shown four adsorbing columns but, as above indicated, any number of columns, one or more, can be employed to suit the requirements of each particular case. Of course, if a single column is used and there are several constituents in the liquid mixture to be separated, the temperature of the column during adsorption can be determined so that one or more of the constituents will pass through without adsorption, and be recovered in the condenser, and then, when adsorption is complete, the column can be heated to one or more successively higher temperatures, according to the number of adsorbed constituents to be separated, to evolve and recover said constituents in succession.

It will be observed that whichever of the above indicated procedures is followed, the process involves essentially passing the liquid mixture to be separated into the adsorptive material and subjecting the latter to successively higher temperatures, so that unadsorbed constituents are separated from those adsorbed, and those adsorbed are separated from each other.

The term "constituent" as used herein is to be understood as meaning a fractional part, of the mixture to be separated, consisting of one or more compounds.

In my improved process of separating the constituents of liquid mixtures the adsorption of the liquid, whether in the liquid or vapor phase, is effected substantially in the absence of diluent gases. In consequence, higher adsorption and a closer approach to true equilibrium between the solid adsorbent and the substance treated can be attained and this results in sharper fractionation or separation of the constituents than would be possible if the sweeping effect of diluent gases was present during adsorption and also makes possible the separation of constituents having boiling points relatively close together.

By means of my improved process, I have been able to secure a much cleaner and more complete separation of liquids than is possible by distillation alone.

The following examples are given as specific illustrations of the use of my process:

Petroleum ether, which by direct distillation yielded 43% by volume of hydrocarbons below 50° C., was distilled with activated carbon and yielded 73.4% of hydrocarbons below 50° C., thus increasing the yield of the said low boiling point hydrocarbons 71.5%.

Again, an alcohol-water mixture which yielded only 50% of alcohol distillate below 80° C., was distilled with carefully dried aluminum silicate and yielded 65% alcohol distillate below 79° C., thus yielding 15% more distillate and at a lower boiling point, and consequently a purer product.

It will be understood that the column temperatures of 90°, 75°, 60° and 45° mentioned above are given simply by way of illustration and that the temperatures or vacua may differ for different applications of the process depending upon the constituents of the liquid mixture to be separated from each other, the adsorbent material used and the number of adsorbent columns.

It will be understood that the forms of apparatus above referred to and shown in the drawing are set forth merely for purposes of illustration and explanation and that there may be wide variations as to procedure and apparatus in the practice of the invention, the scope of the invention being indicated by the appended claims.

What I claim is:

1. The process of separating the constituents of liquid mixtures which consists in adsorbing the mixture in solid adsorbing material, meanwhile substantially excluding diluent gases; progressively evaporating the adsorbed constituents from the adsorbing material to separately evolve the constituents in vapor form; and separately collecting the constituents so evolved.

2. The process of separating the constituents of liquid mixtures which consists in adsorbing the mixture in activated charcoal, meanwhile substantially excluding diluent gases; progressively evaporating the adsorbed constituents from the said charcoal to separately evolve the constituents in vapor form; and separately collecting the constituents so evolved.

3. The process of separating the constituents of liquid mixtures which consists in vaporizing the mixture and passing the vapors thereof into solid adsorbing material, meanwhile substantially excluding diluent gases; progressively evaporating the adsorbed constituents from the adsorbing material to separately evolve the constituents in vapor form; and separately collecting the constituents so evolved.

4. The process of separating the constituents of liquid mixtures, which consists in vaporizing the mixture and passing the vapors thereof into the first of a plurality of columns of solid adsorbing material connected together in series; maintaining said columns at different temperatures successively lower from the first column to the last during adsorption therein of said vapors; after said adsorption evaporating the adsorbed constituents from the columns separately; and separately collecting the constituents so evolved.

5. The process of separating the constituents of liquid mixtures, which consists in vaporizing the mixture and passing the vapors thereof into the first of a plurality of columns of solid adsorbing material connected together in series, meanwhile substantially excluding diluent gases; evaporating the constituents adsorbed in the said material from the columns separately; and separately collecting the constituents so evolved.

6. The process of separating the constituents of liquid mixtures which consists in vaporizing the mixture and passing the vapors into solid adsorbing material, meanwhile substantially excluding diluent gases and maintaining said material at a temperature high enough so that those constituents less subject to adsorption pass through the material unadsorbed while others are adsorbed; thereafter increasing the temperature of said material to evolve the adsorbed constituents; and separately collecting the adsorbed and unadsorbed constituents.

7. The process of separating the constituents of liquid mixtures which consists in vaporizing the mixture and passing the vapors into solid adsorbing material, meanwhile substantially excluding diluent gases and maintaining said material at a temperature high enough so that those constituents less subject to adsorption pass through the material unadsorbed while others are adsorbed; thereafter increasing the temperature of said material progressively to separately evolve the adsorbed constituents; and collecting the adsorbed constituents separately from each other and from those not adsorbed.

8. A process for recovering vapors from mixtures containing them which consists in passing such mixtures through a series of adsorber units, the adsorptive capacity corresponding approximately with different fractions composing the vapors to be recovered, and then distilling off the adsorbed vapors from such units and separately collecting the same.

9. In a process for recovering vapors from mixtures containing them, the steps which consist in passing such mixtures in series through a plurality of adsorber units, and then passing a heating medium capable of driving off such adsorbed vapors through such units in multiple.

In testimony whereof, I hereunto affix my signature.

OSCAR L. BARNEBEY.